(12) United States Patent
Dwyer et al.

(10) Patent No.: US 7,191,654 B2
(45) Date of Patent: Mar. 20, 2007

(54) METHODS AND SYSTEMS FOR ADJUSTING MAGNETIC RETURN PATH WITH MINIMIZED RELUCTANCE

(75) Inventors: Paul W. Dwyer, Seattle, WA (US); Charles Scott, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/161,815

(22) Filed: Aug. 17, 2005

(65) Prior Publication Data
US 2007/0039388 A1 Feb. 22, 2007

(51) Int. Cl.
*G01P 15/13* (2006.01)

(52) U.S. Cl. .................. 73/514.23; 73/514.31

(58) Field of Classification Search .............. 73/514.21, 73/514.23, 514.31, 514.16, 514.17, 514.22, 73/514.36, 514.24
See application file for complete search history.

(56) References Cited

U.S. PATENT DOCUMENTS

| | | | | |
|---|---|---|---|---|
| 4,944,184 | A | * | 7/1990 | Blake et al. ............. 73/514.23 |
| 5,524,488 | A | * | 6/1996 | Foote ...................... 73/514.23 |
| 5,557,044 | A | * | 9/1996 | Foote et al. .................. 73/497 |

* cited by examiner

*Primary Examiner*—Helen Kwok
(74) *Attorney, Agent, or Firm*—Black Lowe & Graham PLLC

(57) ABSTRACT

Accelerometers having higher concentration of flux closer to the proof mass. The invention includes a proof mass, an excitation ring, a magnet, a pole piece, and a coil. The excitation ring includes a ring unit and a base unit that are attached and the ring unit or base unit includes an annular groove. The magnet is mounted to the base unit and the pole piece is mounted to the magnet. The coil is attached directly to the proof mass. A gap is formed between the ring unit and the pole piece. The pole piece includes a first section that has a radius smaller than the radius of a second section.

16 Claims, 4 Drawing Sheets

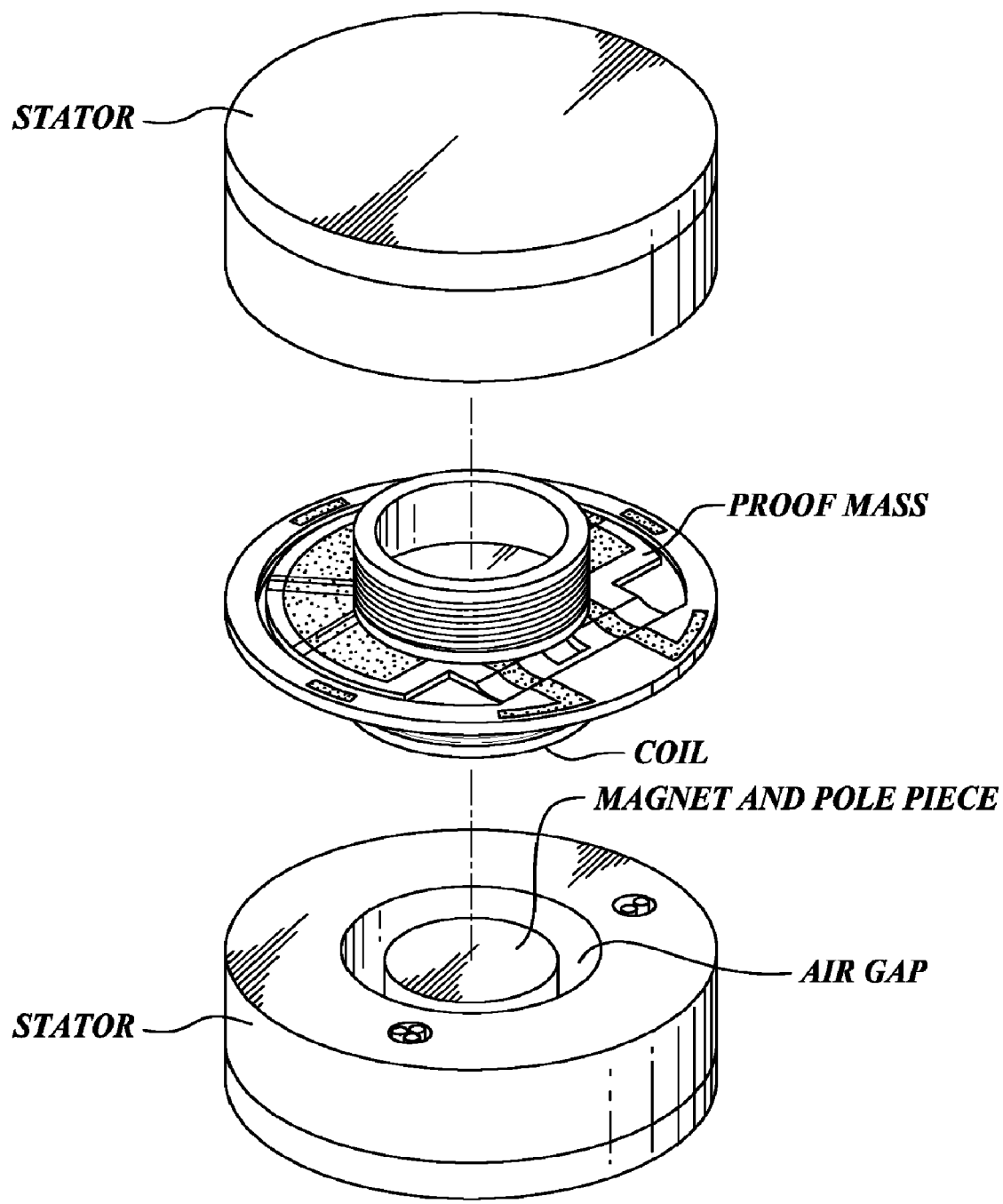
FIG. 1 *(PRIOR ART)*

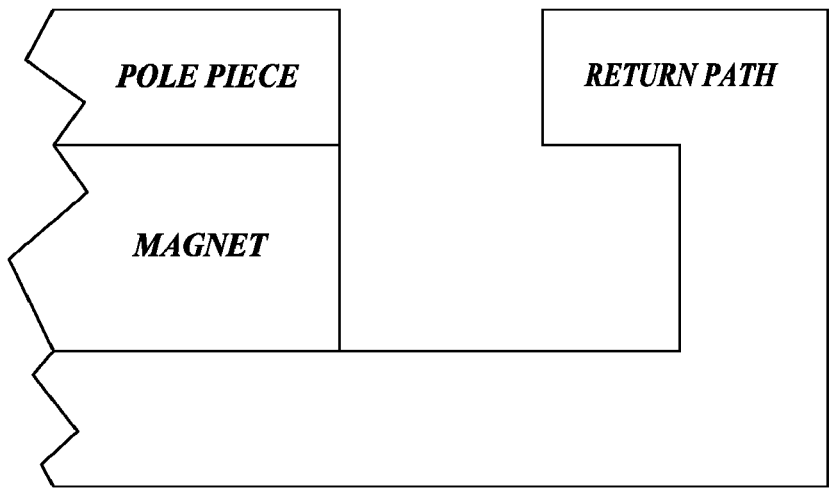
FIG. 2 *(PRIOR ART)*
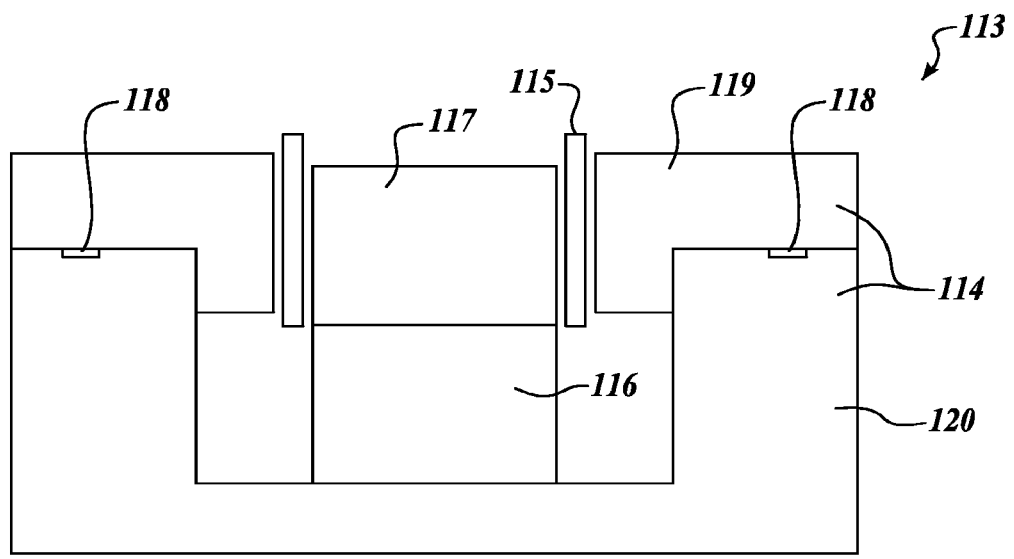
FIG. 3

METHODS AND SYSTEMS FOR ADJUSTING MAGNETIC RETURN PATH WITH MINIMIZED RELUCTANCE

BACKGROUND OF THE INVENTION

Conventional magnetic return paths for accelerometers, such as the accelerometer shown in FIGS. 1 and 2, create a flux distribution in an air gap that interacts with a coil that is attached to a flexible proof mass. The flux interacts with the current in the coil to produce a rebalance force proportional to the acceleration to which the device is subjected. The flux density across the air gap is not uniform given geometric constraints of constructing useful circuits. Further, the field strength of a magnetic circuit is not constant when it interacts with the coil with changing direction of current flow. The field strength follows the minor loop slope of the magnet. If the device is subjected to vibration which can change the orientation of the coil with respect to the flux and the amplitude of the flux itself, the output of the device will change independent of the acceleration being measured. This error is called vibration rectification. For any given magnetic circuit, there is an optimum location of the coil in the field to minimize this effect. Means have been developed to cope with this problem using spacers located between the coil and the proof mass. The spacers increase the pendulosity, add cost and increase the difficulty of manufacturing. Also, the desire to minimize the output change under vibration has lead to the development of short coils that need to be extremely clean and uniformly manufactured to avoid contact with the components that define the air gap.

Therefore, there exists a need to simplify the manufacturing and reduce the cost and complexity of interacting with the flux distribution in accelerometers of this type.

BRIEF SUMMARY OF THE INVENTION

The present invention provides accelerometers having higher concentration of flux closer to the proof mass. In one embodiment, the invention includes a proof mass, an excitation ring, a magnet, a pole piece, and a coil. The excitation ring includes a ring unit and a base unit that are attached and the ring unit includes an annular groove. The magnet is mounted to the base unit and the pole piece is mounted to the magnet. The coil is short and wide, occupying the bulk of the clearance gap in the magnetic circuit and is attached directly to the proof mass. A flux gap is formed between the ring unit and the pole piece.

In one aspect of the invention, the pole piece includes a first section that has a radius smaller than the radius of a second section.

In another aspect of the invention, the coil extends away from the proof mass by approximately 91 mils.

BRIEF DESCRIPTION OF THE SEVERAL VIEWS OF THE DRAWING

The preferred and alternative embodiments of the present invention are described in detail below with reference to the following drawings.

FIGS. 1 and 2 show accelerometers formed in accordance with the prior art; and

FIGS. 3–7 illustrate cross-sectional views of accelerometers formed in accordance with various embodiments of the present invention.

DETAILED DESCRIPTION OF THE INVENTION

Figure 4:
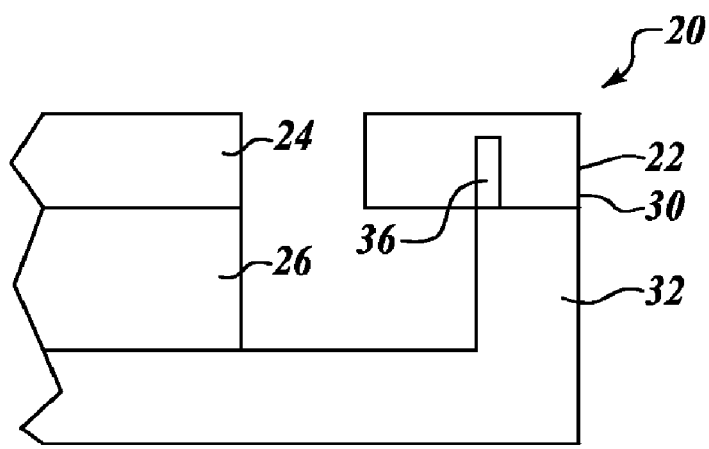
Figure 5:
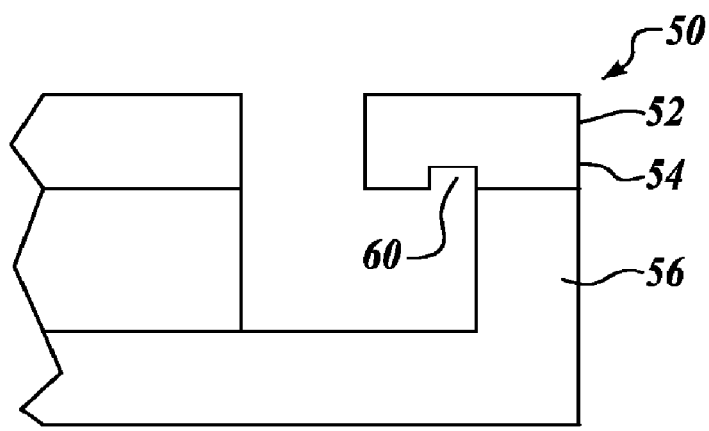

FIGS. 3–5 illustrate cross-sectional views of various embodiments of the present invention. Shown are cross-sectional views of half of an excitation ring with a mounted magnet and pole piece. The excitation rings have been modified in order to move magnetic flux experienced between the excitation ring and the magnet pole piece closer to a planar or top surface of the excitation ring. FIGS. 3–5 shows two-piece construction that simplifies the manufacturing because complex machining tools are not needed.

As shown in FIG. 3, an exemplary accelerometer 113 includes an excitation ring 114, a coil 115, a magnet, and a pole piece 117. In this embodiment, the excitation ring 114 is manufactured from two pieces: a base portion 120 and a top ring 119. Prior to mounting the top ring 119 to the base 120, a groove 118 is machined out of the base portion 120 interior to the edge of a sidewall of the base 120 when attached. Because the base portion 120 is a circular disk, the groove 118 is annular. Because the return path (excitation ring 114) is manufactured in two parts, this groove can be manufactured using conventional turning methods on a lathe. Further, a similar groove can be used to bond the two pieces together with an epoxy perform or carefully applied free-form liquid epoxy without increasing the reluctance of the return path, owing to the fact that there is an excess capacity for flux in that region.

As shown in FIG. 4, an exemplary accelerometer 20 includes an excitation ring 22, a pole piece 24, and a magnet 26. The excitation ring 22 includes a top ring 30 that has been machined to remove a portion of the material to form a groove 36 on a bottom side of the ring 30 when mounted to a base section 32. The groove 36 extends approximately from the interior edge of the base section 32 some distance towards an exterior edge of the ring 30.

As shown in FIG. 5, an exemplary accelerometer 50 includes an excitation ring 52 having a top ring 54 that has been machined to remove a portion of the material to form a groove 60 on a bottom side of the ring 54 when mounted to a base section 56. The groove 60 extends approximately from the interior edge of the base section 56 some distance towards a center of the accelerometer 50, thereby giving the cross-sectional shape of an upper half of the excitation ring 52 a hook shape.

Figure 6:
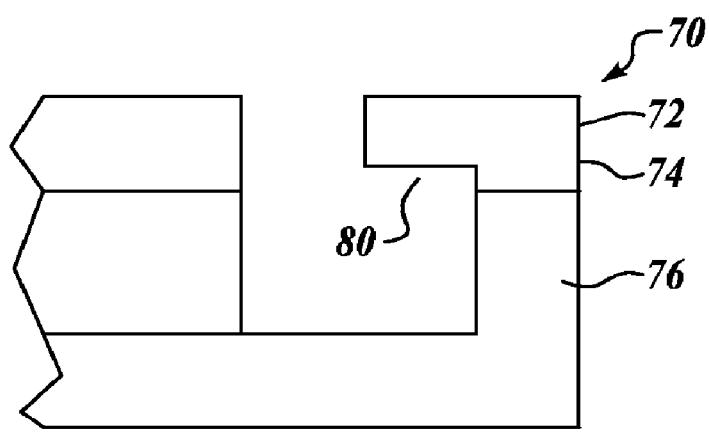

As shown in FIG. 6, an exemplary accelerometer 70 includes an excitation ring 72 having a top ring 74 that has been machined to remove a portion of the material forming a groove 80 on a bottom side of the ring 74 when mounted to a base section 76. The groove 80 is formed by a first wall located approximately at an interior edge of the base section 76 and a second wall approximately orthogonal to the first wall. The second wall is on the bottom surface the ring 74 some distance above a seam formed between the ring 74 and the base section 76, thereby making the cross-sectional shape of an upper half of the excitation ring 72 L-shaped.

Figure 7:
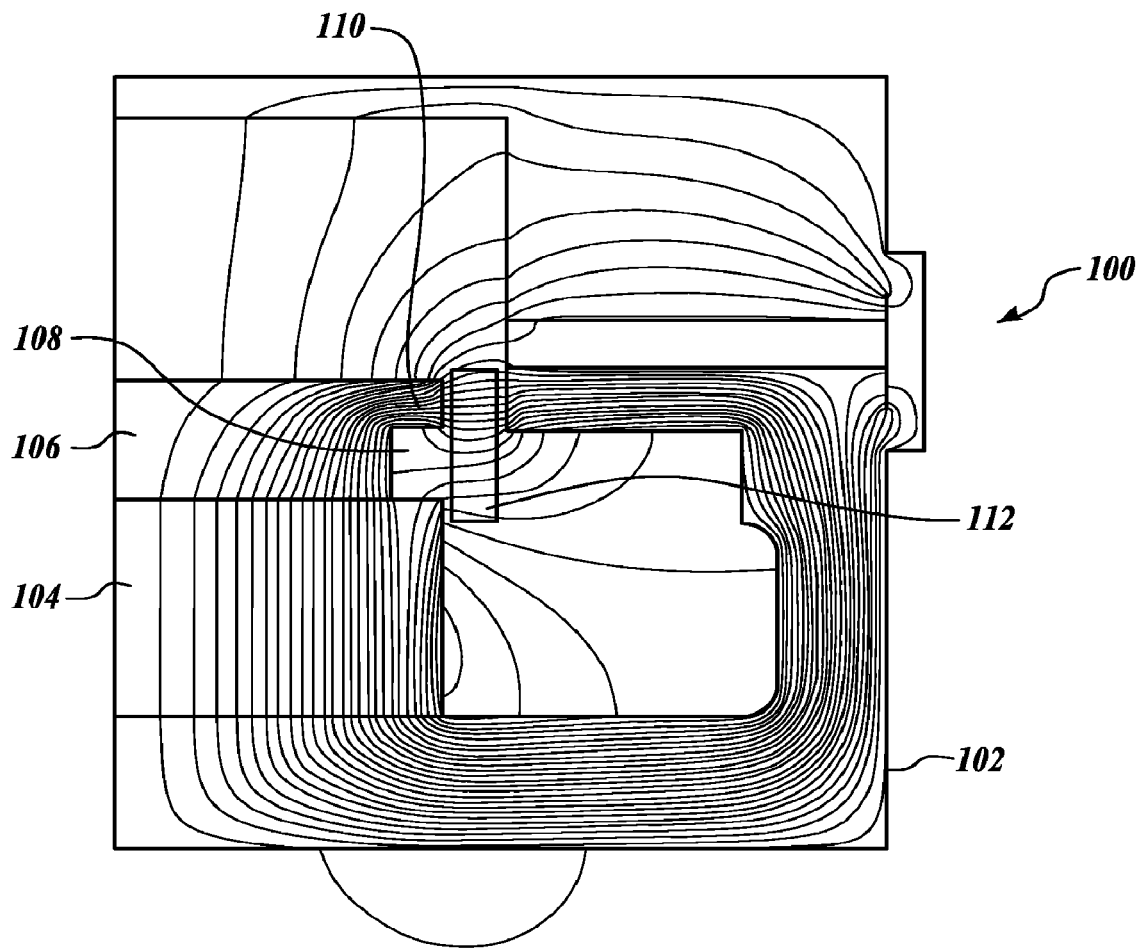

FIG. 7 illustrates another embodiment of the present invention. An accelerometer 100 includes a one piece excitation ring 102 that has been machined at a top section to include a groove similar to the accelerometer 70 as shown in FIG. 5. Also in this embodiment, a pole piece 106 that is mounted on top of a magnet 104 has been machined to form a groove 108 located between the magnet 104 and a flange 110 of the pole piece 106. The groove 108 and the groove in the excitation ring 102 moves magnetic flux, as shown by the flux lines, between the excitation ring 102 and the pole piece 106 closer to the planar surface of the excitation ring 102 and the pole piece 106. This allows for the use of a coil 112 that has no inactive spacer required to locate the coil in the intense magnetic field. A coil 116 that is attached to a proof mass (not shown) extends into the space between the excitation ring 102 and the magnet 104 and the pole piece 106.

All the excitation rings with the machined grooves alone or in combination with the grooved pole piece shown in FIGS. 3–7 concentrate the flux closer to the longitudinal center of the accelerometer and closer to the proof mass. Thus, because the flux is stronger and closer to the proof mass, the coil does not need to protrude into the air gap as far as previous designs. Therefore, the coil does not need the aid of a spacer. Also, less coil (less thickness) and/or coil with a greater distance starting from the proof mass can be used in an embodiment where the length of the coil is such that the flux wanes equally at both ends.

Various heights of the coil may be chosen. For example, coil heights between 50 –75 mil may be chosen depending upon the grooves included in the excitation ring or pole piece and desired results.

While the preferred embodiment of the invention has been illustrated and described, as noted above, many changes can be made without departing from the spirit and scope of the invention. For example, grooves may be of various shapes and may be placed at various locations on the excitation ring or the pole piece depending upon the desired results. Accordingly, the scope of the invention is not limited by the disclosure of the preferred embodiment. Instead, the invention should be determined entirely by reference to the claims that follow.

What is claimed is:

1. An accelerometer comprising:
   a proof mass;
   an excitation ring comprising first section coupled to a second section, the first section located proximate the proof mass, wherein at least one of the first section or the second section includes an annular groove arranged to concentrate a magnetic flux closer to the proof mass;
   a magnet mounted to the second section of the excitation ring;
   a pole piece mounted to the magnet; and
   a coil attached directly to the proof mass,
   wherein the first section is adjacent to the pole piece across a gap.

2. The accelerometer of claim 1, wherein the pole piece includes a first section having a first radius and a second section having a second radius, wherein the first radius of the first section is smaller than the second radius of the second section.

3. The accelerometer of claim 1, wherein the coil extends away from the proof mass more than 50 mil.

4. The accelerometer of claim 1, wherein the coil extends away from the proof mass more than 65 mil.

5. The accelerometer of claim 1, wherein the first and second sections of the excitation ring are coupled to each another by at least one of an adhesive or a weld.

6. An accelerometer comprising:
   a proof mass;
   an excitation ring comprising:
   a ring unit positioned proximate the proof mass; and
   a base unit attached to the ring unit, wherein at least one of the ring unit or the base unit includes an annular groove arranged to concentrate a magnetic flux closer to the proof mass;
   a magnet mounted to the base unit;
   a pole piece mounted to the magnet; and
   a coil attached directly to the proof mass,
   wherein the ring unit is adjacent to the pole piece across a gap.

7. The accelerometer of claim 6, wherein the pole piece includes a first section having a first radius and a second section having a second radius, wherein the first radius of the first section is smaller than the second radius of the second section.

8. The accelerometer of claim 6, wherein the coil extends away from the proof mass more than 50 mil.

9. The accelerometer of claim 6, wherein the coil extends away from the proof mass more than 65 mil.

10. The accelerometer of claim 6, wherein the ring unit and the base unit are attached by at least one of an adhesive or a weld.

11. A method for making an accelerometer having a proof mass, the method comprising:
    machining at least one of a ring unit or a base unit to include at least one annular groove arranged to concentrate a magnetic flux closer to the proof mass when the accelerometer is in operation;
    attaching the machined ring unit to the base unit to form an excitation ring;
    attaching a magnet to the base unit;
    attaching a pole piece to the magnet; and
    positioning the ring unit adjacent to the pole piece across a gap.

12. The method of claim 1, further comprising:
    machining the pole piece to include an annular groove.

13. The method of claim 11, further comprising:
    attaching a coil to the proof mass, wherein the coil extends away from the proof mass more than 91 mil.

14. An accelerometer comprising:
    a proof mass;
    an excitation ring having a first section coupled to a second section, the first section having a top surface proximal the proof mass, the first section having an annular groove arranged to move a magnetic flux experienced in the excitation ring closer to the top surface;
    a magnet mounted to the second section of the excitation ring;
    a pole piece mounted to the magnet; and
    a coil attached directly to the proof mass.

15. The accelerometer of claim 14, wherein the pole piece includes an annular groove located adjacent to the annular groove of the excitation ring across a gap.

16. The accelerometer of claim 14, wherein the first section and the second section are attached by at least one of an adhesive or a weld.

* * * * *